(12) United States Patent
Windisch et al.

(10) Patent No.: US 6,566,465 B1
(45) Date of Patent: May 20, 2003

(54) METHOD FOR POLYMERIZING CONJUGATED DIOLEFINS (DIENES) WITH CATALYSTS BASED ON VANADIUM COMPOUNDS IN THE PRESENCE OF VINYLAROMATIC SOLVENTS

(75) Inventors: Heike Windisch, Leverkusen (DE); Werner Obrecht, Moers (DE); Gisbert Michels, Köln (DE); Norbert Steinhauser, Monheim (DE)

(73) Assignee: Bayer Atkiengesellschaft, Leverkusen (DE)

( * ) Notice: Subject to any disclaimer, the term of this patent is extended or adjusted under 35 U.S.C. 154(b) by 0 days.

(21) Appl. No.: 09/743,535

(22) PCT Filed: Jul. 7, 1999

(86) PCT No.: PCT/EP99/04742

§ 371 (c)(1),
(2), (4) Date: Jan. 11, 2001

(87) PCT Pub. No.: WO00/04063

PCT Pub. Date: Jan. 27, 2000

(30) Foreign Application Priority Data

Jul. 18, 1998 (DE) .......................................... 198 32 442

(51) Int. Cl.$^7$ .............................. C08F 4/68; C08F 36/04
(52) U.S. Cl. .................... 526/169.2; 526/160; 526/281; 526/282; 526/283; 526/308; 526/335; 526/337; 526/339
(58) Field of Search .............................. 526/160, 169.2, 526/335, 337, 281, 282, 283, 308, 339

(56) References Cited

U.S. PATENT DOCUMENTS

| | | | |
|---|---|---|---|
| 3,299,178 A | 1/1967 | Short et al. | 260/880 |
| 3,573,249 A | 3/1971 | Henderson et al. | 260/33.6 |
| 4,189,558 A | * 2/1980 | Witte et al. | 526/169.2 |
| 4,311,819 A | 1/1982 | Tung et al. | 512/173 |
| 4,378,455 A | * 3/1983 | Kawasaki et al. | 526/169.2 X |
| 5,096,970 A | 3/1992 | Hattori et al. | 525/268 |
| 6,015,767 A | 1/2000 | Gibson et al. | 502/152 |

FOREIGN PATENT DOCUMENTS

| | | |
|---|---|---|
| EP | 0 304 088 | 1/1993 |
| EP | 778291 | 6/1997 |

OTHER PUBLICATIONS

J. Polym Sci. Parta: Polym. Chem. 33, (month unavailable) 1995. pp. 2175–2182.
Copolymerization of Butadiene and Styrene with a Gadolinium Tricarboxylate Catalyst. Eiichi Kobayashi, Shojiro Kaita, Sadahito Aoshima, and Junji Frukawa.
Plaste urd Kautschuk 2418 (month unavailable) 1977, pp. 540–544. Beitrage zur Homo– und.
Kopolymerisation von styrol und Butadien mit einem komplexkoordinativen Initiatorsystem auf der Basis von Titan und Jod II. Dr. Martin Harwart, Prof. Dr. Klaus Gehrke.
First East Asian Polymer conference (EAPC–1) Oct. 11–15, (yr unavailable) Shanghai China, pp. 106–107. Vanadium catalysts for the polymerization of butadiene and isoprene. Giovanni Ricci, Anna Panagia, Salvatore Italia.
Polymer 37, (month unavailable) 1996, pp. 363–365. Polymerization of 1,3–dienes with catalysts based on mono– and bis–cyclopentadienyl derivatives of vanadium. Giovanni Ricci and Anna Panagia.
STEPOL '94 International Symposium on Synthetic, Structral & Industrial Aspects of Stereospecific Polymerization, Milan, Jun. 6–10, 1994 p. 90. Influence of Monomer Structure on Chemo– and Steroselectivity of 1,3–Diene Polymerization. Lido Porri, Antonino Giarrusso, Giovanni Ricci.
Journal of Polymer Science: Part A: Polymer Chem. 36 (month unavailable) 1998, pp. 241–247 Homo– and Copolymerization of Butadiene and Styrene with Neodymium Tricarboxylate Catalysts. Eiichi Kobayashi, Nahoto Hayashi, Sadahito Aoshima, Junji Furukawa.

* cited by examiner

*Primary Examiner*—Fred Teskin
(74) *Attorney, Agent, or Firm*—Joseph C. Gil; Jennifer R. Seng; Noland J. Cheung

(57) ABSTRACT

Conjugated diolefins, optionally in combination with other unsaturated compounds which may be copolymerized with the diolefins, are polymerized by performing the polymerization of the diolefins in the presence of catalysts based on monocyclopentadienyl compounds of vanadium and alumoxanes in the presence of aromatic vinyl compounds as the solvent at temperatures of –30 C. to +80 C. By means of the process according to the invention, it is possible to straightforwardly produce solutions of polydiolefins, such as polybutadiene, having 1,2 unit contents of 10 to 30% in aromatic vinyl compounds, which solutions may then, for example, be further processed to yield ABS or HIPS.

7 Claims, No Drawings

METHOD FOR POLYMERIZING CONJUGATED DIOLEFINS (DIENES) WITH CATALYSTS BASED ON VANADIUM COMPOUNDS IN THE PRESENCE OF VINYLAROMATIC SOLVENTS

FIELD OF THE INVENTION

This invention relates to a process for the polymerisation of conjugated diolefins with catalysts based on vanadium compounds in the presence of aromatic vinyl compounds.

BACKGROUND OF THE INVENTION

It has long been known to polymerise conjugated dienes in the presence of a solvent and such polymerisation has been described, for example, by W. Hoffmann, *Rubber to Technology Handbook*, Hanser Publishers (Carl Hanser Vertag), Munich, Vienna, New York, 1989. Polybutadiene, for example, is accordingly now predominantly produced by solution polymerisation using coordination catalysts of the Zielger/Natta type, for example based on titanium, cobalt, nickel and neodymium compounds, or in the presence of alkyllithium compounds. The solvent used in each case is highly dependent upon the type of catalyst used. Benzene or toluene as well as aliphatic or cycloaliphatic hydrocarbons are preferably used.

A disadvantage of currently performed polymerisation processes for the production of polydiolefins, such as for example BR, IR, SBR, is the elaborate working up of the polymer solution to isolate the polymers, for example by steam stripping or direct evaporation. A further disadvantage, especially if the polymerised diolefins are to be further processed as impact modifiers for plastics applications, is that the resultant polymeric diolefins must initially be redissolved in a new solvent, for example styrene, so that they may be further processed to yield, for example, acrylonitrile/butadiene/styrene copolymer (ABS) or high impact polystyrene (HIPS).

U.S. Pat. No. 3,299,178 claims a catalyst system based on $TiCl_4$/iodine/Al(iso-Bu)$_3$ for the polymerisation of butadiene in styrene to form homogeneous polybutadiene. Harwart et al., *Plaste und Kautschuk*, 24/8 (1977) 540, describe the copolymerisation of butadiene and styrene using the same catalyst system and the suitability of the catalyst for the production of polystyrene.

It is known from U.S. Pat. No. 4,311,819 to use anionic initiators for the polymerisation of butadiene in styrene. The disadvantage of the anionic initiators is that they result in the formation of butadiene/styrene copolymers (SBR) which, in relation to the butadiene units, permit only slight control of microstructure. It is only possible to increase the proportion of 1,2 or 1,4-trans units by adding modifiers, which results in an increase in the glass transition temperature of the polymer. Using anionic initiators, it is not possible to produce an SBR having an elevated cis content in which the 1,4-cis content, relative to the butadiene content, is above 40%, particularly preferably above 60%. This fact is primarily disadvantageous because SBR is formed in this process in which, in comparison with homopolymeric polybutadiene (BR), a rising styrene content results in a further increase in the glass transition temperature. However, if the rubber is to be used for impact modification of for example HIPS or ABS, an elevated glass transition temperature of the rubber has a disadvantageous effect on the low temperature properties of the material.

Kobayashi et al, *J. Polym. Sci., Part A, Polym. Chem.*, 33 (1995) 2175 and 36 (1998) 241 have described a catalyst system consisting of halogenated rare earth acetates, such as $Nd(OCOCCl_3)_3$ or $Gd(OCOCF_3)_3$, with tri(isobutyl) aluminium and diethyl-aluminium chloride, which allows the copolymerisation of butadiene and styrene in the inert solvent hexane. Apart from the presence of inert solvents, the disadvantage of these catalysts is that, at a styrene incorporation of as little as approx. 5 mol. %, the catalyst activity falls to below 10 g of polymer/mmol. of catalyst/h and that the 1,4-cis content of the polymer falls distinctly as the styrene content rises.

U.S. Pat. No. 5,096,970 and EP 304088 describe a process for the production of polybutadiene in styrene using catalysts based on neodymium phosphonates, organic aluminium compounds, such as di(isobutyl)aluminium hydride (DIBAH), and a Lewis acid containing halogen, such as ethylaluminium sesquichloride, in which butadiene is reacted in styrene without further addition of inert solvents to yield a 1,4-cis-polybutadiene.

A disadvantage of this catalyst is that the resultant polymers have a very low content of 1,2 units of below 1%. This is disadvantageous because a higher 1,2 content in the polymer has a favourable effect on the grafting behaviour between rubber and the polymer matrix, for example homo- or copolymers of vinyl aromatic compounds.

The rubber solutions in styrene described in the stated patent publications have been used for the production of HIPS by combining the rubber solutions in styrene with free-radical initiators once the unreacted monomer had been removed.

SUMMARY OF THE INVENTION

The object of the present invention was accordingly to provide a process for the polymerisation of conjugated diolefins in vinyl aromatic solvents, by means of which it is possible to obtain polydiene rubbers having an elevated proportion of double bonds in cis position of above 50% and a 1,2 unit content of 10% to 30%. It should moreover be possible to achieve an elevated conversion of the conjugated diolefins used of above 50%, wherein only less than 1% of the introduced vinyl aromatic solvents are reacted.

DETAILED DESCRIPTION OF THE INVENTION

The present invention accordingly provides a process for the polymerisation of conjugated diolefins (dienes), which process is characterised in that polymerisation of the conjugated dienes is performed in the presence of catalysts consisting of a) vanadium compounds, and b) alumoxanes as well as in the presence of vinyl aromatic compounds at temperatures of −30 to 80° C., wherein the molar ratio of components (a):(b) is in the range from 1:10–1000, the quantity of component (a) of the catalyst used is 1 µmol. to 10 mmol, relative to 100 g of the monomers used, and the quantity of aromatic vinyl compounds is 10 g to 2000 g, relative to 100 g of the monomers used.

The molar ratio of components (a):(b) is preferably in the range from 1:20–500.

Conjugated diolefins which may be used in the process according to the invention are, for example 1,3-butadiene, 1,3-isoprene, 2,3-dimethylbutadiene, 2,4-hexadiene, 1,3-pentadiene and/or 2-methyl-1,3-pentadiene.

It is, of course, also possible in the process according to the invention additionally to use, as well as the conjugated diolefins, further unsaturated compounds, such as ethylene, propene, 1-butene, 1-pentene, 1-hexene, 1-octene and/or cyclopentene, preferably ethylene, propene and/or 1-octene, which may be copolymerised with the stated diolefins.

The quantity of unsaturated compounds which may be copolymerised with the conjugated diolefins is dependent upon the particular intended application of the desired copolymers and may readily be determined by appropriate preliminary testing. It is conventionally 0.1 to 80 mol. %, preferably 0.1 to 50 mol. %, particularly preferably 0.1 to 30 mol. %, relative to the diolefin used.

Compounds of the formulae (I), (II) or (III) may in particular be considered as the vanadium compound (component (a))

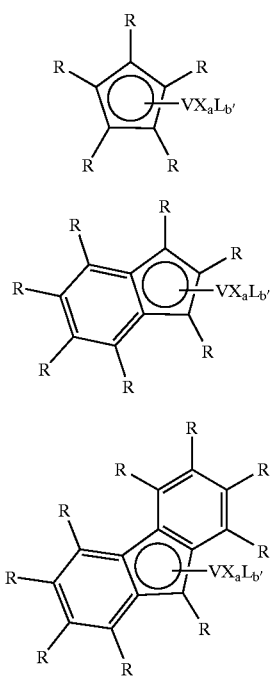

wherein,

R is identical or different or the residues R are joined together or are fused on the cyclopentadienyl ring of the formula (I), indenyl ring of the formula (II) or on the fluorenyl ring of the formula (III) and denote(s) hydrogen, a $C_1$–$C_{30}$ alkyl group, a $C_6$–$C_{20}$ aryl group, a $C_7$–$C_{40}$ alkylaryl group or a $C_3$–$C_{30}$ silyl group, wherein the alkyl group may be either saturated or mono- or polyunsaturated and may contain heteroatoms such as oxygen, nitrogen or halides, X is identical or different and denotes a halide, an organyl group having 1 to 20 carbon atoms, which may optionally be substituted by heteroatoms, an alkoxide group or an amide group having 1 to 20 carbon atoms or an oxide ion, L is identical or different and denotes a Lewis-basic compound, a has a value of 2, 3 or 4 in accordance with the valency of the vanadium and b denotes a number from 0 to 4.

In the above formulae, R preferably means a linear or branched alkyl group having 1 to 12 carbon atoms, such as methyl, ethyl, n-propyl, isopropyl, n-butyl, isobutyl, tert.-butyl, n- and isopentyl, n- and isohexyl or n- and isooctyl. R furthermore means a phenyl group preferably having 6 to 20 carbon atoms, such as phenyl, tolyl, naphthyl, or a benzyl group having 7 to 20 carbon atoms, such as benzyl. The stated hydrocarbon residues may be substituted by heteroatoms, such as silicon, nitrogen, phosphorus, oxygen, sulfur, fluorine and chlorine or be attached to the aromatic residue via appropriate heteroatoms. Trimethylsilyl, trifluoromethyl or pentafluorophenyl are, for example, preferred. Hydrogen, tert.-butyl, methyl, trimethylsilyl and pentafluorophenyl may be mentioned as very particularly preferred instances of R.

Instances of X which may preferably be mentioned are halides, such as fluoride, bromide, chloride and iodide, organyl groups, such as linear or branched alkyl groups having 1 to 20 carbon atoms, such as methyl, tert.-butyl, neopentyl, phenyl groups which have 6 to 20 carbon atoms and are unsubstituted or substituted by lower alkyl groups, such as phenyl, tolyl, naphthyl, benzyl groups which have 7 to 20 carbon atoms and are unsubstituted or substituted by lower alkyl groups, such as benzyl. The stated organic residues may in turn be substituted by heteroatoms, preferably by silicon, nitrogen, phosphorus, oxygen, sulfur, fluorine or chlorine, very particularly preferably by silicon or fluorine. Organic compounds substituted by heteroatoms which may in particular be mentioned are trifluoromethyl, pentafluorophenyl, trimethylsilylmethyl as well as bis(trimethylsilyl)methyl. Chloride, bromide, methyl, benzyl and bis(trimethylsilyl)methyl may be mentioned as very particularly preferred instances of X.

Lewis-basic inorganic or organic compounds are preferably used as L, which, as is known to the person skilled in the art, may coordinate on the vanadium thanks to their electron donating nature. Particularly preferred compounds are those which contain at least one element of groups Vb and VIb of the periodic system of elements, such as for example nitrogen, phosphorus, oxygen and sulfur, particularly preferably nitrogen, phosphorus or oxygen, as the donor atom. These are, for example, ethers, thioethers, esters, ketones, amines, phosphines or silicon/oxygen compounds.

The following Lewis-basic compounds may particularly preferably be mentioned as L: dimethyl ether, diethyl ether, dipropyl ether, dibutyl ether, dihexyl ether, dioctyl ether, methyl ethyl ether, ethyl butyl ether, methyl butyl ether, tetrahydrofuran, tetrahydrothiophene, trimethylamine, triethylamine, dimethylphenylamine, trimethylphosphine, triethylphosphine, triphenylphosphine.

Aluminium/oxygen compounds are used as the alumoxanes (component (b)), which, as is known to the person skilled in the art, are obtained by bringing organoalumium compounds into contact with for example water, and which constitute acyclic or cyclic compounds of the formula $(-Al(R)O-)_n$, wherein R may be identical or different and denotes a linear or branched alkyl group having 1 to 10 carbon atoms, which may additionally contain heteroatoms, such as for example oxygen or halogens. R in particular denotes methyl, ethyl, n-propyl, isopropyl, n-butyl, isobutyl, tert.-butyl, n-octyl or isooctyl, particularly preferably methyl, ethyl or isobutyl. Examples of alumoxanes which may be mentioned are: methylalumoxane, ethylalumoxane and isobutylalumoxane, preferably methylalumoxane and isobutylalumoxane.

Examples of compounds of the formulae (I), (II) and (III) are, for example, stated in EP 778291, EP 816384, L. Porri et al. in STEPOL '94, *International Symposium on Synthetic, Structural & Industrial Aspects of Stereospecific Polymerisation*, Milan, Jun. 6–10, 1994, p. 90, G. Ricci et al.

in *First East-Asian Polymer Conference* (*EAPC*-1), October 11–15, Shanghai, China, pp. 106–7 and G. Ricci et al. in *Polymer*, 37 (1996), 363. The compounds mentioned therein are thus included in the subject matter of the present application.

It may be pointed out in this connection that the component (a) vanadium compounds and component (b) alumoxanes may be used both individually and as a mixtures with each other. The most favourable mixing ratio may readily be determined by appropriate preliminary testing.

In the process according to the invention, component (a) of the catalysts is preferably used in quantities of 10 μmol. to 5 mmol., relative to 100 g of the monomers.

It is, of course, also possible to use the catalysts in any desired mixture with each other.

The process according to the invention is performed in the presence of aromatic vinyl compounds, in particular in the presence of styrene, α-methylstyrene, α-methylstyrene dimer, p-methylstyrene, divinylbenzene and/or other alkylstyrenes having 2 to 6 C atoms in the alkyl residue, such as p-ethylstyrene, p-butylstyrene.

The polymerisation according to the invention is very particularly preferably performed in the presence of styrene, α-methylstyrene, (α-methylstyrene dimer and/or p-methylstyrene as solvent.

The solvents may be used individually or as a mixture; the most favourable mixing ratio may readily be determined by appropriate preliminary testing.

The quantity of aromatic vinyl compounds used is preferably 30 to 1000 g, very particularly preferably 50 to 500 g, relative to 100 g of monomers used.

The process according to the invention is preferably performed at temperatures of 0 to 70° C.

The process according to the invention may be performed without pressure or at elevated pressure (0.1 to 12 bar).

The process according to the invention may be implemented continuously or discontinuously, preferably with continuous operation.

The solvent (aromatic vinyl compounds) used in the process according to the invention need not be removed by distillation, but may instead remain in the reaction mixture. In this manner, it is possible, for example when styrene is used as the solvent, subsequently to perform a second polymerisation for the styrene, wherein an elastomeric polydiene in a polystyrene matrix is obtained. Similarly, acrylonitrile may be added to the polydiene solution in styrene before the second polymerisation is performed. In this manner, ABS is obtained. Such products are of particular interest as impact-modified thermoplastics.

It is, of course, also possible to remove a proportion of the solvent used and/or of the unreacted monomers after polymerisation, preferably by distillation optionally under reduced pressure, in order to achieve the desired polymer concentration.

Further components, for example unsaturated organic compounds, such as acrylonitrile, methyl methacrylate, maleic anhydride, maleimides, which may be copolymerised with the vinyl aromatic solvent, and/or usual aliphatic or aromatic solvents, such as benzene, toluene, ethylbenzene, dimethylbenzene, hexane, heptane or octane, and/or polar solvents, such as ketones, ethers or esters, which are conventionally used as solvents and/or diluents for the polymerisation of the vinyl aromatics, may furthermore be added to the polymer solution before or during the subsequent polymerisation of the solvent, which may be initiated in a known manner by free-radical or thermal means.

As has already been mentioned above, the process according to the invention is distinguished by particular economic viability and good environmental compatibility, as the solvent used may be polymerised in a subsequent stage, wherein the polymer present in the solvent serves to modify thermoplastics (for example to increase impact strength).

In the process according to the invention, the composition and thus the properties of the resultant polymers may be varied very widely. For example, by varying the catalyst composition, preferably by varying the Lewis acids, it is possible purposefully to adjust the content of 1,2 units, i.e. of lateral double bonds in the polymer chain, within broad limits without in so doing polymerising or copolymerising the vinyl aromatic solvent.

It is furthermore possible very straightforwardly to influence the molecular weights and branching of the polymers and thus also the solution viscosity of the polymers, such as for example by varying the catalyst concentration, the diene concentration, the reaction temperature or by adding suitable chain-transfer agents, such as for example hydrogen, 1,2-butadiene or cyclooctadiene.

Another advantage of the process according to the invention is that, in the case of direct polymerisation in styrene, it is also possible to produce and straightforwardly further process low molecular weight polymers of such a low molecular weight that, as solids having elevated cold flow or elevated tackiness, they could be processed and stored only with difficulty.

The advantage of low molecular weight polymers is that, even at an elevated polymer content, the solution viscosity remains as low as desired and the solutions may consequently readily be conveyed and processed.

EXAMPLES

The polymerization reactions were performed in the absence of air and moisture under argon. The isolation of the polymers from the solution in styrene was performed solely for the purpose of characterizing the polymers obtained. The polymers may, of course, also be stored and appropriately further processed in the solution in styrene without being isolated.

The styrene used as the solvent for the diene polymerization was stirred under argon for 24 hours over $CaH_2$ at 25° C. and distilled at 25° C. under reduced pressure. In order to demonstrate that polymerization is also possible with stabilized styrene, certain quantities of the stabilizer (2,6-di-tert.-butyl)(4-methyl)phenol (=Ionol) were added and the polymerization of the butadiene performed in the presence of the stabilizer.

The styrene content in the polymer is determined by $^1$H-NMR spectroscopy, polybutadiene selectivity (1,4-cis, 1,4-trans and 1,2content) is determined by IR spectroscopy.

What is claimed is:

1. Process for the polymerization of conjugated dienes, wherein polymerization of the conjugated diolefins is performed in the presence of catalysts comprising
    a) vanadium compounds, and
    b) alumoxanes as well as in the presence of vinyl aromatic compounds at temperatures of −30 to 80° C., wherein the molar ratio of components (a):(b) is in the range from 1:10–1000, the quantity of component (a) of the catalyst used is 1 μmol. to 10 mmol., relative to 100 g of the monomers used, and the quantity of aromatic vinyl compounds is 10 g to 2000 g, relative to 100 g of the monomers used.

2. Process according to claim 1, wherein the conjugated diolefins are selected from the group consisting of 1,3-butadiene, 1,3-isoprene, 2,3-dimethylbutadiene, 2,4-hexadiene, 1,3-pentadiene and 2-methyl-1,3-pentadiene.

3. Process according to claim 1, wherein the aromatic vinyl compounds are selected from the group consisting of styrene, α-methylstyrene, α-methylstyrene dimer, p-methylstyrene, divinylbenzene and alkylstyrenes having 2 to 6 C atoms in the alkyl residue.

4. Process according to claim 1, wherein the aromatic vinyl compounds are selected from the group consisting of styrene, α-methylstyrene, α-methylstyrene dimer, p-methylstyrene, divinylbenzene and alkylstyrenes having 2 to 6 C atoms in the alkyl residue.

5. Process according to claim 1, wherein said process is performed continuously or discontinuously.

6. Process according to claim 1, wherein, in addition to said conjugated dienes, further unsaturated compounds which are copolymerized with the stated diolefins are additionally used, in quantities of 0.1 to 80 mol. %, relative to the diene used.

7. Process according to claim 6, wherein the unsaturated compounds which are copolymerized with diolefins used are ethylene, propylene, 1-butene, 1-pentene, 1-hexene, 1-octene, cyclopentene, norbornene, ethylidenenorbornene, vinylnorbornene and dicyclopentadiene.

* * * * *